Jan. 4, 1938. J. S. BARTEK 2,104,604
CUTTER CLAMPING MECHANISM
Filed Nov. 25, 1936
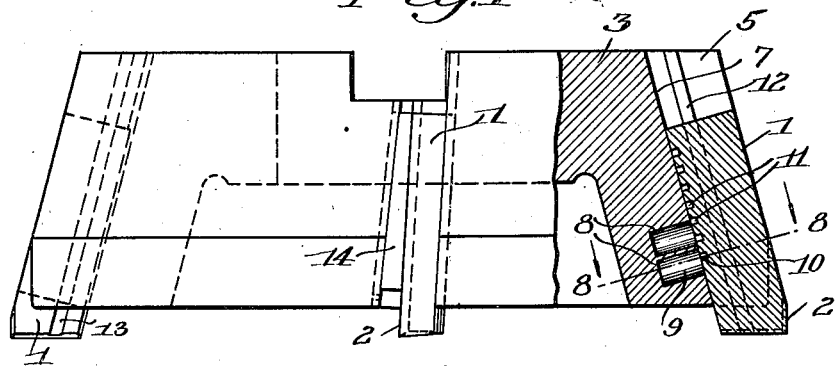
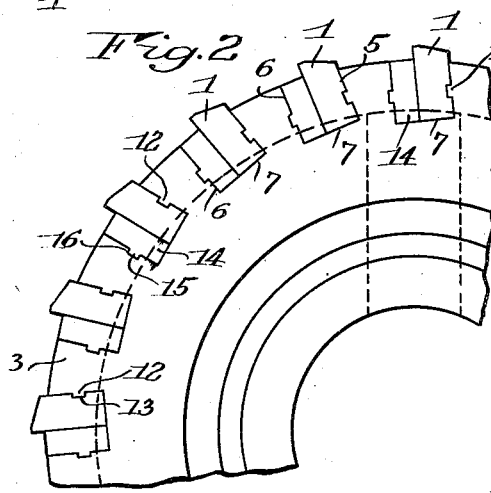
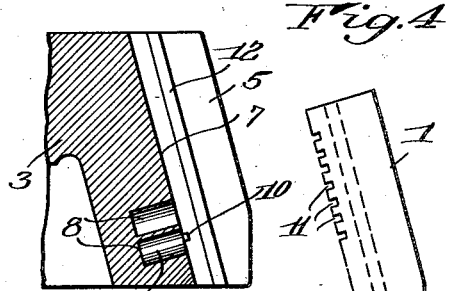
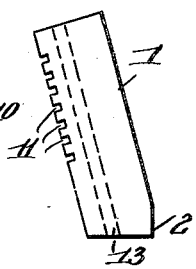
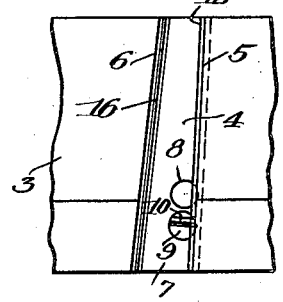
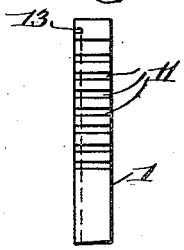
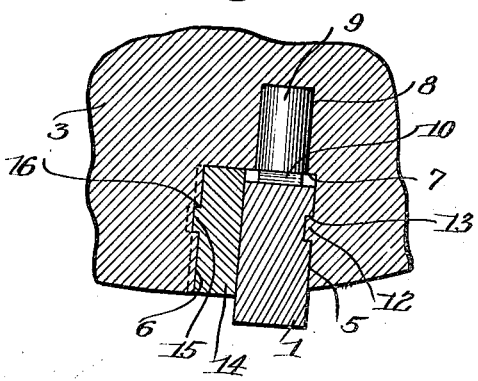
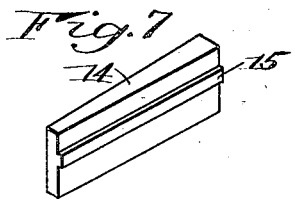
INVENTOR.
John S. Bartek
BY Harold E. Stonebraker,
his ATTORNEY.

Patented Jan. 4, 1938

2,104,604

UNITED STATES PATENT OFFICE 2,104,604

CUTTER CLAMPING MECHANISM

John S. Bartek, Rochester, N. Y., assignor to Consolidated Machine Tool Corporation, Rochester, N. Y., a corporation of Delaware Application November 25, 1936, Serial No. 112,714

4 Claims. (Cl. 29—105)

My invention relates to a cutter clamping mechanism, and has to do more particularly with means for clamping a metal cutting tool on to a cutter head, and a principal purpose of the invention is to afford a simple and practical structure that requires no bolts or threaded securing elements, the cutter body being held in place by a frictionally engaged wedge member or key.

A further purpose of the invention is to provide a construction of simple design and low manufacturing cost, with an arrangement that permits a cutter body to be quickly clamped to a cutter head or removed therefrom, while the cutter, after assembly on the head, is rigidly retained against movement in any direction.

Another purpose of the invention is to provide a construction wherein the cutter body is so related to the head as to be held against movement in two directions while movement in the third direction is resisted by the wedge member or tapered key, the latter being related to the cutter head in such a manner that it is locked against movement in two directions and has a drive fit between the cutter body and head that serves to hold the parts rigidly assembled until the wedge member or key is forcibly ejected from the slot in which it is positioned.

To these and other ends, the invention comprises the construction and arrangement of parts that will appear clearly from the following description when read in conjunction with the accompanying drawing, the novel features being pointed out in the claims following the specification.

In the drawing:

Fig. 1 is a view in side elevation of a conventional type of cutter head, partially in section, and showing applied thereto a preferred embodiment of cutter clamping mechanism forming the subject matter of the invention;

Fig. 2 is a partial plan view of the same;

Fig. 3 is a detail view similar to the right hand portion of Fig. 1, showing the slot in the cutter head with the cutter removed;

Fig. 4 is a side view of a cutter;

Fig. 5 is a side elevation of the head looking from right to left of Fig. 3;

Fig. 6 is an edge elevation of the cutter, looking from left to right of Fig. 4;

Fig. 7 is a perspective view of the wedge member or tapered key, and

Fig. 8 is an enlarged sectional view on the line 8—8 of Fig. 1 looking in the direction indicated.

The invention is herein illustrated as applied to a finishing cutter, but is likewise applicable to roughing cutter assemblies or to other types of milling cutters, and any other application where it is desirable to removably clamp a cutter or tool in position upon a head or support, and in the exemplary embodiment illustrated, the cutter body is designated at 1 and includes the finish cutting edge 2, a series of such cutters being clamped at uniform distances around a cutter head which is adapted to be mounted and rotated in any conventional type of milling machine.

To this end, the cutter head 3 is provided with a series of slots or guideways 4 extending across its periphery, each of said slots being defined by side walls 5 and 6 which have a longitudinally converging or tapered relation, as shown in Fig. 5.

The bottom 7 of each slot or guideway is provided with two or more openings 8 to receive a pin 9 that carries an abutment or lug 10 extending slightly above the bottom 7 of the slot transversely thereof, affording locking means that engages the cutter body and holds the same against movement endwise of the slot. To this end, the cutter body 1 is provided on its inner edge with a series of transverse slots 11, any one of which can be brought into engagement with the abutment 10 to properly position the cutter body in the slot, and a finer adjustment can be had by shifting the pin 9 to either opening 8 in order to bring the cutting edge to the exact position desired.

Endwise movement of the cutter body in the slot being prevented in the manner just described by the abutment 10, movement of the cutter body transversely of the slot in a direction outwardly away from the bottom 7 is prevented by an interlocking engagement between the cutter head and the cutter body preferably in the form of a tongue 12 extending endwise of the side wall 5 of the slot and engageable with a cooperating groove 13 formed along one side of the cutter body. The latter is positioned by first placing the selected slot 11 on its inner surface over the abutment 10 and then moving the cutter body laterally until its groove 13 is engaged with the tongue 12, thus bringing the parts into the position illustrated in Fig. 1. Following this, the cutter body is locked in position by a tapered key or wedge member 14 which is driven endwise of the slot, as shown in Figs. 1 and 8, one side of the tapered key engaging the cutter body while the other side thereof engages the side wall of the slot. When the wedge member 14 is driven home, the cutter body is effectually and firmly held against movement in any direction and is rigidly clamped to the cutter head in such fashion that it cannot be removed until the wedge member is forcibly ejected.

It is essential to hold the tapered key or wedge member against movement transversely of the slot in a direction outwardly away from the bottom thereof, and this is preferably accomplished by providing a tongue and groove interlocking connection between the cutter head and the wedge member, a tongue 15 being preferably formed on the wedge member or key and extending endwise thereof along one side while the adjacent side wall of the slot is provided with a cooperating longitudinally extending slot 16 to receive said tongue 15, although this result might be accomplished in other ways so long as the cutter body and wedge member have an interlocked relation with the cutter head so as to prevent transverse movement of these parts in a direction outwardly away from the bottom of the slot in the cutter head.

With the construction described, a cutter can be quickly secured in proper position on a cutter head, or can be removed with equal facility, but is retained firmly against accidental displacement. The cutter is held rigidly and locked against movement in any one of three directions, and the securing wedge member or tapered key is also locked against movement in two directions, the tapered relation between the side walls of the slot serving effectually to hold the tapered key frictionally against accidental displacement and requiring a forceful blow to remove it when the cutter is to be disassembled.

While the invention has been disclosed herein as embodying certain details, it is not confined to the particular construction or arrangement of parts described, and this application is intended to cover any departures or modifications coming within the intent of the improvement or the scope of the following claims.

I claim:

1. The combination with a cutter head having a slot therein defined by endwise tapering side walls, said slot being of sufficient width throughout its depth to accommodate a cutter body and wedge and to permit lateral movement of the cutter body when positioning the same, and a locking abutment projecting above the bottom of the slot, of a cutter body positionable by a movement laterally of the bottom of said slot against one side wall of the slot in locking engagement with said abutment to prevent endwise movement of the cutter body, a wedge member tapering endwise in thickness, said wedge member being widest at its front end and narrowest at its rear end and movable endwise of the slot into clamping position by movement from the cutting end of said cutter body toward the rear end thereof and positionable on the bottom of said slot between the cutter body and the other side wall of the slot to prevent lateral movement of the cutter body, and locking means on the head engaging the wedge member and cutter body and acting to prevent movement thereof in a direction outwardly away from the bottom of the slot, the wedge member being engaged with the cutter body and with a side wall of the slot throughout the depth of said slot.

2. The combination with a cutter head having a slot therein defined by endwise tapering side walls, said slot being of sufficient width throughout its depth to accommodate a cutter body and wedge and to permit lateral movement of the cutter body when positioning the same, and a locking abutment projecting above the bottom of the slot, of a cutter body positionable by a movement laterally of the bottom of said slot against one side wall of the slot in locking engagement with said abutment to prevent endwise movement of the cutter body, a wedge member tapering endwise in thickness, said wedge member being widest at its front end and narrowest at its rear end and movable endwise of the slot into clamping position by movement from the cutting end of said cutter body toward the rear end thereof and positionable on the bottom of said slot between the cutter body and the other side wall of the slot to prevent lateral movement of the cutter body, and interlocking means between said side walls and the cutter body and wedge member respectively and acting to prevent movement thereof in a direction outwardly away from the bottom of the slot, the wedge member being engaged with the cutter body and with a side wall of the slot throughout the depth of said slot.

3. The combination with a cutter head having a slot therein defined by endwise tapering side walls, said slot being of sufficient width throughout its depth to accommodate a cutter body and wedge and to permit lateral movement of the cutter body when positioning the same, of a cutter body positionable against one side wall of the slot, a tongue and groove connection between the cutter body and said side wall extending longitudinally of the latter, a locking abutment adjustably positionable along the bottom wall of the slot, the cutter body having a series of transverse slots selectively engageable by lateral movement with said abutment, a wedge member tapering endwise in thickness, said wedge member being widest at its front end and narrowest at its rear end and movable endwise of the slot into clamping position by movement from the cutting end of said cutter body toward the rear end thereof and positionable on the bottom of said slot between the cutter body and the other side wall of the slot, and a tongue and groove connection between said wedge member and the last mentioned side wall and extending longitudinally of the latter, the wedge member being engaged with the cutter body and with a side wall of the slot throughout the depth of said slot.

4. The combination with a cutter head having a slot therein defined by endwise tapering side walls, said slot being of sufficient width throughout its depth to accommodate a cutter body and wedge and to permit lateral movement of the cutter body when positioning the same, of a cutter body positionable against one side wall of the slot, a tongue and groove connection between the cutter body and said side wall extending longitudinally of the latter, a locking abutment adjustably positionable along the bottom wall of the slot, the cutter body having a series of transverse slots selectively engageable by lateral movement with said abutment, a wedge member tapering endwise in thickness, said wedge member being widest at its front end and narrowest at its rear end and movable endwise of the slot into clamping position by movement from the cutting end of said cutter body toward the rear end thereof and positionable on the bottom of said slot between the cutter body and the other side wall of the slot, and locking means on the head and wedge member acting to prevent movement of the wedge member in a direction outwardly away from the bottom of the groove, the wedge member being engaged with the cutter body and with a side wall of the slot throughout the depth of said slot.

JOHN S. BARTEK.